(12) United States Patent
Stark

(10) Patent No.: US 7,153,581 B2
(45) Date of Patent: Dec. 26, 2006

(54) EXTRUDABLE, LOW-MIGRATION ORGANIC SILICONE COPOLYMERS OF HIGH TRANSPARENCY, THEIR PREPARATION AND USE

(75) Inventor: Kurt Stark, Burgkirchen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 394 days.

(21) Appl. No.: 10/354,498

(22) Filed: Jan. 30, 2003

(65) Prior Publication Data
US 2003/0195316 A1 Oct. 16, 2003

(30) Foreign Application Priority Data
Apr. 15, 2002 (DE) ................ 102 16 608

(51) Int. Cl.
*B32B 25/20* (2006.01)
(52) U.S. Cl. ............. 428/447; 526/279; 526/344; 526/346; 526/348; 526/329.7
(58) Field of Classification Search ........... 526/279, 526/344, 346, 348, 329.7; 428/447
See application file for complete search history.

(56) References Cited

U.S. PATENT DOCUMENTS

| 3,879,491 A | 4/1975 | Lindsey et al. |
| 4,153,641 A | 5/1979 | Deichert et al. |
| 4,981,555 A | 1/1991 | Hohmann et al. |
| 5,086,141 A | 2/1992 | Georges |
| 5,219,560 A | 6/1993 | Suzuki et al. |
| 6,180,741 B1 | 1/2001 | Yamaguchi et al. |
| 2002/0107324 A1 * | 8/2002 | Vanderlaan et al. ........ 525/100 |

FOREIGN PATENT DOCUMENTS

| DE | 37 06 095 A1 | 8/1987 |
| DE | 100 64 092 A1 | 7/2002 |
| EP | 0 159 894 A2 | 4/1985 |
| EP | 0 168 624 A1 | 6/1985 |
| EP | 0 254 050 A2 | 1/1988 |
| EP | 0 352 339 A1 | 1/1990 |
| EP | 0 541 103 A1 | 5/1993 |
| EP | 1 059 336 | 12/2000 |
| JP | 62-290768 | 6/1986 |
| WO | WO 91/15538 | 10/1991 |
| WO | WO 95/00578 | 1/1995 |
| WO | WO 96/39459 | 12/1996 |

OTHER PUBLICATIONS

English Abstract (CPI-Ref. 91-062703/09) Corresponding To JP-A 03-12416.
English Abstract (CPI-Ref. 86-097534/15) Corresponding To JP-A 61-42519.
English Abstract Corresponding To JP-A 62-290768 [AN 1988-032052].
Derwent Abstract Corresponding To EP 168 624 [AN 1986-000648].
Derwent Abstract Corresponding To DE 37 06 095 [AN 1987-243633].
Derwent Abstract Corresponding To DE 100 64 092 [AN 2002-547932].
H.G. Elias, Makromdekule, vol. 1, pp. 148-184, pp. 299-350, pp. 376-414; vol. 2, pp. 68-116.
Polymer Handbook, 2nd Edition, J. Wiley & Sons, New York [1975], III-139 to III-191.
Fox T.G., Bull. Am. Physics Soc. 1, 3, p. 123 [1956].

* cited by examiner

Primary Examiner—Kuo-Liang Peng
(74) Attorney, Agent, or Firm—Brooks Kushman P.C.

(57) ABSTRACT

The invention provides organic silicone copolymers based on
a) from 30 to 99% by weight of a vinylaromatic, (meth)acrylic ester, vinyl ester, olefin, diene, and/or vinyl halide monomer, and
b) from 1 to 70% by weight of a mixture of at least two diorganopolysiloxanes having the general formula $R^1_a R_{3-a} SiO(SiR_2 O)_n SiR_{3-a} R^1_a$, in which each R denotes a monovalent, optionally substituted, $C_{1-18}$ alkyl or $C_{1-18}$ alkoxy radical, $R^1$ denotes a polymerizable group, a is 0 or 1, at least one a being 1, and n is an integer, where
b1) from 5 to 65% by weight of the silicone component b) is a diorganopolysiloxane with $n \leq 30$ and only one terminal polymerizable group $R^1$, and
b2) from 35 to 95% by weight of the silicone component b) is a diorganopolysiloxane with $n \geq 55$ and with one or two terminal polymerizable groups $R^1$.

13 Claims, No Drawings

EXTRUDABLE, LOW-MIGRATION ORGANIC SILICONE COPOLYMERS OF HIGH TRANSPARENCY, THEIR PREPARATION AND USE

BACKGROUND OF THE INVENTION

1. Field of the Invention

The invention relates to extrudable, low-migration organic silicone copolymers of high transparency, and to their preparation and use.

2. Background Art

To produce abhesive coatings, curable polyorganosiloxanes are applied to substrate materials and then cured through use of thermal energy or radiation. Curing of the coating material is frequently the rate-determining step in the production of adhesive substrate materials. Additionally, it is necessary to install drying ovens or UV or IR lamps, whose operation is highly energy-consuming. Accordingly, more recent developments have been aimed at providing coating materials which allow this curing step to be omitted.

EP-A 168624 describes the coextrusion of PP backing films with an anti-adhesive layer comprising a polydimethylsiloxane. EP-A 541103 discloses coating of laminated PET films by application of emulsions of polysiloxane-polyvinyl graft polymers, the polysiloxane component being composed of a cyclic siloxane and a siloxane containing a free-radically polymerizable group, in the presence of which the vinyl monomers are polymerized. EP-A 254050 describes the production of a release liner by extrusion of a reaction product of H-siloxane and a hydrocarbon compound containing at least one ethylenically unsaturated group.

U.S. Pat. No. 5,086,141 discloses a crosslinked polysiloxane-styrene/butadiene copolymer obtained by polymerizing styrene and butadiene in the presence of a difunctional polysiloxane. WO-A 96/39459 describes block copolymers of ethylene and cyclic siloxane monomers which can be used in coextrusion for release liners. By blending with HDPE, release liners having good abhesive properties may be obtained. WO-A 95/00578 discloses coextrusion-prepared copolymers of monofunctional silicones and functionalized polyolefins, which can be used as release material. WO-A 91/15538 describes release films comprising a base polymer and a silicone copolymer which is composed of a hard organic polymer segment and a soft polydialkylsiloxane segment. This copolymer is admixed with the base polymer as an additive.

EP-A 352339 describes protective coatings for concrete constructions, comprising copolymers of divinyl-polydimethylsiloxane with acrylate or methacrylate esters and with vinyl-functional or acryloyl-functional alkoxysilanes, as a solution in organic solvents. Thermally curable acrylic resins supplied as a solution in organic solvents, useful for coating metals, especially stainless steel, are the subject matter of EP-A 159894. To improve adhesion to metals, in particular to prevent flaking of the coating when coated metal parts are deformed, acrylic resin solutions of copolymers of (meth)acrylates, hydroxy-functional or epoxy-functional (meth)acrylates, vinyl-functional polysiloxanes, and vinyl-functional silanes are used. To improve adhesion the polymers are subjected to post-crosslinking catalyzed by organotin compounds, and are cured thermally.

U.S. Pat. No. 3,879,491 discloses modified thermoplastics obtained by polymerizing ethylenically unsaturated monomers in the presence of polydiorganosiloxanes. U.S. Pat. No. 4,985,155 relates to a textile treatment composition based on a graft copolymer obtained by polymerizing acrylates or meth-acrylates in the presence of a polydiorganosiloxane bearing moieties containing ethylenically unsaturated double bonds. DE-A 3706095 describes the preparation of resins containing polysiloxane units by polymerizing a vinyl monomer in the presence of a double-bond-functionalized polysiloxane which contains at least two hydroxide and/or amine functional groups.

DE-A 10064092 pertains to polyorganosiloxanes for producing abhesive coatings which do not require addition of thermal energy or radiation to cure. The polyorganosiloxanes are silicone block copolymers containing a crosslinkable hard-segment polymer component and a soft-segment polyorganosiloxane component. These silicone block copolymers are prepared by reactive coupling of the block segments or by polymerization of the hard segment component in the presence of the polyorganosiloxane.

The products known to date, however, frequently exhibit unsatisfactory abhesive properties, migration of silicone from the release layer or low substrate adhesion, or are difficult to obtain by synthesis. Moreover, they often possess no transparency, since the silicone component and the organic polymer component are incompatible, leading to the formation of domains or to phase separation. Furthermore, the known products often cannot be applied by means of extrusion. In many cases the organic silicone copolymers described are too highly crosslinked and can no longer be processed as thermoplastics.

SUMMARY OF THE INVENTION

Objects of the invention were to provide extrudable, low-migration organic silicone copolymers of high transparency which are suitable for producing abhesive coatings, and with which the aforementioned disadvantages are avoided. These and other objects are met by copolymers derived from a vinyl aromatic, (meth)acrylic ester, vinyl ester, olefin, diene, and/or vinyl halide monomer, and from at least two distinct unsaturated polyorganosiloxanes, as described hereafter.

DETAILED DESCRIPTION OF THE PREFERRED EMBODIMENT(S)

The invention thus provides organic silicone copolymers comprising a) from 30 to 99% by weight, based on the total weight of components a) and b), of one or more monomers from the group consisting of vinylaromatics, methacrylic or acrylic esters of alcohols having from 1 to 15 carbon atoms, vinyl esters of branched or unbranched alkylcarboxylic acids having from 1 to 15 carbon atoms, olefins, dienes, and vinyl halides and b) from 1 to 70% by weight, based on the total weight of components a) and b), of a silicone component composed of a mixture of at least two diorganopolysiloxanes having the general formula $R^1_a R_{3-a} SiO(SiR_2O)_n SiR_{3-a} R^1_a$, in which each R is identical or different and denotes a monovalent, optionally substituted alkyl or alkoxy radical having from 1 to 18 carbon atoms, $R^1$ denotes a polymerizable group, a is identical or different and denotes 0 or 1, at least one a being 1, and n is an integer, where b1) from 5 to 65% by weight of the silicone component b) is composed of one or more diorganopolysiloxanes with $n \leq 30$ and only one terminal polymerizable group $R^1$, and b2) from 35 to 95% by weight of the silicone component b) is composed of one or more diorganopolysiloxanes with $n \geq 55$ and with one or two terminal polymerizable groups $R^1$. The figures in % by weight add up in each case to 100% by weight.

Examples of suitable (meth)acrylic esters a) include methyl acrylate, methyl methacrylate, ethyl acrylate, ethyl methacrylate, propyl acrylate, propyl methacrylate, n-, iso-, and t-butyl acrylate, n-, iso-, and t-butyl methacrylate, 2-ethylhexyl acrylate, and norbornyl acrylate. Particular preference is given to methyl acrylate, methyl methacrylate, n-, iso-, and t-butyl acrylate, 2-ethylhexyl acrylate, and norbornyl acrylate.

Suitable vinyl esters a) are vinyl esters of branched or unbranched alkylcarboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 5 to 11 carbon atoms, examples being VeoVa9®, a vinyl ester of an α-branched monocarboxylic acid having 9 carbon atoms, or VeoVa10®, a vinyl ester of an α-branched monocarboxylic acid having 10 carbon atoms, both tradenames of Shell. Particular preference is given to vinyl acetate.

Examples of suitable vinylaromatics a) include styrene and α-methylstyrene. Preference is given to styrene. Suitable olefins and dienes a) are ethylene, propylene, 1,3-butadiene, and isoprene. Preference is given to ethylene. A suitable vinyl halide a) is vinyl chloride.

If desired, from 0.01 to 20% by weight, preferably from 0.01 to 5% by weight of auxiliary monomers may be copolymerized, based in each case on the total weight of the monomers a). Examples of auxiliary monomers are acrylic and methacrylic acid. Further auxiliary monomers are ethylenically unsaturated monocarboxylic acids such as crotonic acid, and dicarboxylic acids such as fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters; maleic anhydride; and ethylenically unsaturated sulfonic acids and their salts, preferably vinylsulfonic acid and 2-acrylamido-2-methylpropanesulfonic acid. Further auxiliary monomers which can be used include polymerizable epoxides such as glycidyl acrylate, glycidyl methacrylate, allyl glycidyl ether, vinyl glycidyl ether, vinylcyclohexene oxide, limonene oxide, myrcene oxide, and caryophyllene oxide. Preference is given to using glycidyl acrylate, glycidyl methacrylate, allyl glycidyl ether, and vinyl glycidyl ether.

Suitable hydrolyzable silicon compounds may also be used as auxiliary monomers. Preference is given to ethylenically unsaturated and hence copolymerizable silicon compounds of the general formula $R^3SiR^2_{0-2}(OR^4)_{1-3}$, where $R^2$ is a $C_1$ to $C_3$ alkyl radical, $C_1$ to $C_3$ alkoxy radical, or halogen (e.g., Cl or Br), $R^3$ is $CH_2=CR^3-(CH_2)_{0-1}$ or $CH_2=CR^5CO_2(CH_2)_{1-3}$, $R^4$ is a branched or unbranched, unsubstituted or substituted alkyl radical having from 1 to 12 carbon atoms, preferably from 1 to 3 carbon atoms, or is an acyl radical having from 2 to 12 carbon atoms, it being possible for $R^4$ to be interrupted, if desired, by an ether group, and $R^5$ stands for H or $CH_3$.

Preference is given to γ-acryloyloxy- and γ-methacryloyloxypropyltri(alkoxy)silanes, α-methacryloyloxymethyltri(alkoxy)silanes, γ-methacryloyloxypropylmethyldi(alkoxy)silanes, vinylalkyldi(alkoxy)silanes, and vinyltri(alkoxy)silanes, examples of alkoxy groups which can be used being methoxy, ethoxy, methoxyethylene, ethoxyethylene, methoxypropylene glycol ether, and ethoxypropylene glycol ether radicals. Examples of suitable silicon compounds are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy) isopropoxysilane, vinyltributoxysilane, vinyltriacetoxysilane, 3-methacryloyloxypropylmethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, tris(acetoxy)vinylsilane, and 3-(triethoxysilyl)propylsuccinic anhydride-silane.

Also suitable are functionalized hydrolyzable silicon compounds from the group of the epoxysilanes and aminosilanes which are added during the polymerization, such as glycidyloxypropyltrimethoxysilane, glycidyloxypropyltriethoxysilane, 3-(2-aminoethylamino)propyltrimethoxysilane, and 3-(2-aminoethylamino)propylmethyldimethoxysilane.

Further suitable silane compounds include, in particular, mercaptosilanes which have a chain transfer effect, for examples those of the general formula $HS-(CR^6_2)_{1-3}$-$SiR^7_3$, $R^6$ being identical or different and being H or a $C_1$ to $C_6$ alkyl group, $R^7$ being identical or different and being a $C_1$ to $C_6$ alkyl group or $C_1$ to $C_6$ alkoxy group, at least one of the radicals $R^7$ being an alkoxy group. Preference is given to 3-mercaptopropyltriethoxysilane, 3-mercaptopropyltrimethoxysilane, and 3-mercaptopropylmethyldimethoxysilane.

The most preferred silane auxiliary monomers are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-(triethoxysilyl)propylsuccinic anhydridesilane, 3-mercaptopropyltrimethoxysilane, glycidyloxypropyltrimethoxysilane, glycidyloxypropyltriethoxysilane, 3-methacryloyloxypropyltrimethoxysilane, 3-methacryloyloxypropylmethyldimethoxysilane, and methacryloyloxymethyltrimethoxysilane, and mixtures thereof.

Further examples of auxiliary monomers are precrosslinking comonomers such as polyethylenically unsaturated comonomers, examples being divinyl adipate, divinyl benzene, diallyl maleate, allyl methacrylate, butanediol diacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers or esters of N-methylolacrylamide, of N-methylolmethacrylamide, or of N-methylolallylcarbamate, such as the isobutyl ethers.

Greatest preference as component a) is given to homopolymers and copolymers of styrene and of (meth) acrylic esters of alcohols having from 1 to 15 carbon atoms such as methyl acrylate, methyl methacrylate, ethyl acrylate, ethyl methacrylate, propyl acrylate, propyl methacrylate, n-, iso-, and t-butyl acrylate, n-, iso-, and t-butyl methacrylate, 2-ethylhexyl acrylate, and norbornyl acrylate, which where appropriate also contain the abovementioned auxiliary monomers in the stated amounts.

The organic silicone copolymers of the invention contain the silicone component b) in amounts of from 1 to 70% by weight, preferably from 3 to 50% by weight, and most preferable from 5 to 40% by weight, based in each case on the total weight of the organic silicone copolymer. The organic silicone copolymers of the invention possess a weight-average molecular weight ($M_w$) of from 1000 to 2,000,000, preferably from 5000 to 1,000,000, and most preferably from 10,000 to 800,000.

The silicones b) are generally linear or branched diorganopolysiloxanes having a chain length n of 2 to 3000, essential constituents being silicones b1) having an average chain length $\leq 30$, preferably from 2 to 25, and most preferably from 5 to 20, and silicones b2) having an average chain length $\geq 55$, preferably from 55 to 1000, and most preferably from 60 to 500. The silicones b1) contain only one terminal polymerizable group and the silicones b2) likewise most preferably contain only one terminal polymerizable group, although for the silicones b2) it is also preferable to use mixtures of monofunctional and difunctional compounds.

In the general formula $R^1_aR_{3-a}SiO(SiR_2O)_nSiR_{3-a}R^1_a$ examples of radicals R include methyl, ethyl, n-propyl, iso-propyl, 1-n-butyl, 2-n-butyl, iso-butyl, tert-butyl, n-pentyl, iso-pentyl, neo-pentyl, tert-pentyl radical, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, and cycloalkyl radicals such as cyclopentyl, cyclohexyl, cycloheptyl, and methylcyclohexyl radicals. With preference the radical R is a monovalent hydrocarbon radical having from 1 to 6 carbon atoms, such as the methyl, ethyl, n-propyl, isopropyl, n-butyl, sec-butyl, amyl, and hexyl radicals, the methyl radical being particularly preferred.

Preferred alkoxy radicals R are those having from 1 to 6 carbon atoms such as the methoxy, ethoxy, propoxy, and n-butoxy radicals, optionally substituted by oxyalkylene radicals such as oxyethylene or oxymethylene radicals. Particular preference is given to the methoxy and ethoxy radical. The alkyl and alkoxy radicals R may also optionally be substituted, for example, by halogen, mercapto groups, epoxy-functional groups, carboxyl groups, keto groups, enamine groups, amino groups, aminoethylamino groups, isocyanato groups, aryloxy groups, alkoxysilyl groups, and hydroxyl groups. These substituents are illustrative, and not limiting.

Suitable polymerizable groups $R^1$ include alkenyl radicals having from 2 to 8 carbon atoms. Examples of such polymerizable groups are the vinyl, allyl, and butenyl groups as well as acryloyloxyalkyl and methacryloyloxyalkyl groups, wherein the alkyl radicals contain 1 to 4 carbon atoms. Preference is given to the vinyl, acryloyloxymethyl, 3-methacryloyloxypropyl, and 3-acryloyloxypropyl groups.

Preference as silicone b) is given to α,ω-divinylpolydimethylsiloxanes, α,ω-di(3-acryloyloxypropyl)-polydimethylsiloxanes, α,ω-di(3-methacryloyloxypropyl)-polydimethylsiloxanes, α,ω-di(acryloyloxymethyl)-polydimethylsiloxanes, α-monovinylpolydimethylsiloxanes, α-mono(3-acryloyloxypropyl)-polydimethylsiloxanes, α-mono(3-methacryloyloxypropyl)-polydimethylsiloxanes, α-mono(acryloyloxymethyl)-polydimethylsiloxanes, and α-mono (methacryloyloxymethyl)-polydimethylsiloxanes. Particular preference is given to mixtures of linear or branched mono (meth)acryloyloxyalkyl-functional silicones with chain length $\leq 30$, and linear or branched mono(meth)acryloyloxyalkyl-functional silicones with chain length $\geq 55$, the (meth)acryloyloxyalkyl group being present in each case at the chain end. In the case of the monofunctional polydimethylsiloxanes, there is preferably an alkyl or alkoxy radical at the other chain end, a methyl or butyl radical for example. Examples of suitable silicones are terminal monomethacrylate-functionalized polydimethylsiloxanes from Chisso Corporation, Japan. Particularly suitable is a mixture of Chisso FM 0711 (average chain length 11 with polydispersity D=1.4) and Chisso FM 0721 (average chain length 63 with polydispersity D=2.4). The polydispersity D may be determined from GPC measurements from the ratio $M_w/M_n$, mobile phase THF, p.a., relative to polystyrene standards with molecular weight 110,000, 37,000, 13,700, 4000, 1390, and 310. These silicones are available commercially.

The glass transition temperature of the organic silicone copolymers is from 0° C. to 120° C., preferably from 20° C. to 110° C. From the glass transition temperature Tg the skilled worker is aware which monomers or monomer mixtures can be used to prepare the inventive copolymers. The glass transition temperature Tg of the polymers can be determined conventionally by means of differential scanning calorimetry (DSC). The Tg may also be calculated approximately in advance using the Fox equation. According to T. G. Fox, BULL. AM. PHYSICS SOC. 1, 3, page 123 (1956), $1/Tg=x_1/Tg_1+x_2/Tg_2+\ldots+x_n/Tg_n$, where mass fraction (% by weight/100) of the monomer n and $Tg_n$ is the glass transition temperature, in kelvin, of the homopolymer of the monomer n. Tg values for homopolymers are listed in THE POLYMER HANDBOOK, 2nd Edition, J. Wiley & Sons, New York (1975).

The preparation of the silicones b) is known to the skilled worker, for example, by ring-opening polymerization of D3 or D4 cyclic compounds (low molecular weight cyclic dialkylsiloxanes) using suitable catalysts, followed by end-group functionalization with low molecular weight compounds possessing a polymerizable group. With the selection of a suitable catalyst for the ring opening of the cyclic dialkylsiloxanes it is also possible to incorporate a further functional group into the polymerizable silicone component. Appropriate processes for preparing copolymers are cited in H. G. Elias, MAKROMOLEKÜLE, Volume 2, Technologie, Hüthig & Wepf Verlag, Basle, Heidelberg, N.Y., 5th edition, 1992, pp. 68–116 and H. G. Elias, MAKROMOLEKÜLE, Volume 1, Chemische Struktur und Synthese, Wiley VCH, Weinheim, N.Y., Chichester, Brisbane, Toronto, Singapore, 6th edition, 1999, chapter 6, pp. 148–184, chapter 10, pp. 299–350, and chapter 12, pp. 376–414.

The invention further provides a process for preparing organic silicone copolymers by free-radical initiated polymerization of a) from 30 to 99% by weight, based on the total weight of components a) and b), of one or more monomers from the group consisting of vinylaromatics, (meth)acrylic esters of alcohols having from 1 to 15 carbon atoms, vinyl esters of optionally branched alkylcarboxylic acids having from 1 to 15 carbon atoms, olefins, dienes, and vinyl halides in the presence of b) from 1 to 70% by weight, based on the total weight of components a) and b), of a silicone component composed of a mixture of at least two diorganopolysiloxanes having the general formula $R^1_aR_{3-a}SiO(SiR_2O)_nSiR_{3-a}R^1_a$, in which each R is identical or different and denotes a monovalent, optionally substituted, alkyl radical or alkoxy radical having in each case from 1 to 18 carbon atoms, $R^1$ denotes a polymerizable group, a is identical or different and denotes 0 or 1, at least one a being 1, and n is an integer, where b1) from 5 to 65% by weight of the silicone component b) is composed of one or more diorganopolysiloxanes with $n\leq 30$ and only one terminal polymerizable group $R^1$, and b2) from 35 to 95% by weight of the silicone component b) is composed of one or more diorganopolysiloxanes with $n\geq 55$ and with one or two terminal polymerizable groups $R^1$.

The polymerization is carried out conventionally, preferably by bulk polymerization, suspension polymerization or by polymerization in organic solvents. Particular preference is given to solution polymerization in an organic solvent and to suspension polymerization in water. It is also possible to carry out a precipitation polymerization in a solvent which dissolves the monomers a) and the silicone component b) but precipitates the resultant organic silicone copolymer. Alternatively, precipitation can be brought about from the homogeneous solution of the copolymer in the polymerization medium by adding a nonsolvent for the organic silicone copolymer.

In the case of polymerization in solution it is possible to use organic solvents such as tetrahydrofuran (THF), diethyl ether, petroleum ether, methyl acetate, ethyl acetate, methyl ethyl ketone, acetone, isopropanol, propanol, ethanol, methanol, toluene or benzene.

The polymerization is conducted at a temperature of from 25° C. to 100° C. and is free-radically initiated by adding one or more common initiators. General examples of common initiators are azo initiators such as azobis(isobutyronitrile), percarbonates such as cyclohexyl peroxydicarbonate or peresters such as t-butyl peroxyneodecanoate or t-butyl peroxypivalate.

In the case of suspension polymerization it is preferred to carry out polymerization at different temperatures, depending on the decomposition temperatures of the initiators used in each case. It is also possible to operate a temperature ramp over a certain period of time, preferably in temperature stages of $\Delta T=5°$ C. to 10° C. Examples of particularly preferred oil-soluble free-radical initiators in the case of suspension polymerization are t-butyl peroxy-2-ethylhexanoate, t-butyl peroxypivalate, t-butyl peroxyneodecanoate, dibenzoyl peroxide, t-amyl peroxypivalate, di(2-ethylhexyl) peroxydicarbonate, 1,1-bis(t-butylperoxy)-3,3,5-trimethylcyclohexane, and di(4-t-butylcyclohexyl)peroxydicarbonate, and also azobis(isobutyronitrile) (AIBN).

Adjusting the molecular weight and hence the degree of polymerization is known to the skilled worker, for example, by adding chain transfer agents, through varying the solvent content, by varying the concentration of initiator, and by varying the temperature. Examples of regulators or chain transfer agents are isopropanol, ethylbenzene (preferably in the case of suspension polymerization), and dodecyl mercaptan. The polymerization of monomers which are gaseous at room temperature, such as ethylene, is carried out under pressure.

For the preparation of the organic silicone copolymer, components a) and b) can all be included in the initial charge (batch operation), or else some of the components may be introduced in the initial charge and the remainder metered in (semibatch operation). In the case of suspension polymerization, preference is given to batch processes, wherein all of the components, thoroughly suspended in an aqueous medium, are included in the initial charge. In the case of suspension polymerization, the suspending and stabilizing of components a) and b) in the form of droplets is achieved by means of water-soluble protective colloids such as polyvinylpyrrolidone or polyvinyl alcohol. Oil-soluble initiators are generally used. It is preferred to employ two or more initiators which differ in their decomposition temperatures. The initiator or initiators may all be introduced in the initial charge, some included in the initial charge and some metered in, or may be metered in its (their) entirety in order to carry out the polymerization.

In the case of solution polymerization, the semibatch process is particularly preferred. In this process the ratio of monomers a) to polymerizable silicone component b) is preferably set so as to be approximately constant at any given point in time during polymerization, thereby resulting in a homogeneous polymer. If desired, further initiator can be added toward the end of the polymerization in order to modify the copolymer by means of grafting reactions.

After the end of polymerization in solution, the solvent, together with any excess monomer and regulator, may be removed by distillation, optionally under reduced pressure. Residual monomer can also be minimized beforehand by means of postpolymerization with further addition of initiator, if desired. The suspension polymers can also be freed from volatile constituents by treatment with steam, i.e. in a stripping operation. The suspension polymers are obtained in the form of beads of variable diameter which can be separated from water by filtration and then dried.

In the context of the invention it is particularly important to obtain low-migration organic silicone copolymers. Unpolymerized silicone, which results in migration, cannot be removed by distillation in the case of solution polymerization or by steam distillation in the case of suspension polymerization, owing to the high boiling point. In one particularly preferred embodiment migration is reduced by washing the organic silicone copolymer obtained by means of the previously described polymerization processes with a solvent which is a very poor solvent or a nonsolvent for the organic silicone copolymer and which is a poor to moderate solvent for the silicone component b). This measure removes residual monomers, especially non-bound silicone b), and initiator fragments and phlegmatizers of the initiator, such as hydrocarbons.

Suitable solvents are those in which the solubility of the organic silicone copolymer under standard conditions is <0.1 g per 100 ml of solvent, and the solubility of the silicone component b) is >0.1 g per 100 ml. A solvent suitable for this purpose depends on the organic polymer component. Generally suitable examples include toluene, benzene, ethyl acetate, hexane, cyclohexane, heptane, chloroform, methylene chloride, 1,2-dimethoxyethane, isopropyl acetate, methyl ethyl ketone, THF, isopropanol, and ethanol. Examples of suitable solvents in the case of organic silicone copolymers based on styrene, for example, are isopropanol or cyclohexane.

The two components of the organic silicone copolymer of the invention are a nonpolar soft segment, which originates from the silicone component b), and a hard segment, which derives from the organic polymer a). Adhesion can be increased further by incorporating abovementioned auxiliary monomers. Additionally, the hard segment gives the organic silicone copolymer physical properties such that it is not liquid at 25° C. and can be extruded. The rheology can be controlled by selection of the monomers a) and b) and, where appropriate, of the auxiliary monomers so as to allow a noncrosslinked, thermoplastic, and extrudable organic silicone copolymer to be obtained. The phase angle $\delta$ (obtainable from oscillating rheological measurements on the melted organic silicone copolymer at a frequency of 1 Hz in the linearly viscoelastic range) desirably exhibits a value of $\geq 45°$ in the temperature range between 100° C. and 200° C., either starting from a certain temperature within this range, or within a temperature interval within said range. The phase angle $\delta$ is defined as follows: $\tan \delta = G''/G'$, with $G'$ being the storage modulus and describing the elastic properties and $G''$ being the loss modulus, which provides information on the viscous properties. If the phase angle $\delta$ is greater than or equal to 45°, the organic silicone copolymer in the melt has predominantly thermoplastic properties.

Phase separation and incompatibility of the polymers obtained from contemporaneous incorporation of the monomers a) and of silicone components which would lead to the formation of domains and thus to turbid copolymers and to further disadvantages, are reduced or prevented entirely by the inventive selection of the constituents of the silicone component b). This is done such that there is a defined fraction of low molecular mass, monofunctional silicones b1) having a chain length $\leq 30$ in the mixture of the silicone component b). As a result, the relatively high molecular mass, monofunctional, or mono- and difunctional, silicones b2) which have chain lengths $\geq 55$ and are responsible for a good release effect, are made compatible with the polymer chains of the monomers a) and are copolymerized with the monomers a) so as to give a homogeneous and highly transparent organic silicone copolymer.

The organic silicone copolymers can be used as protective coatings in construction applications. Furthermore, they are suitable for coating textiles, paper, polymer films, and metals. Another field of use is as modifiers and water repellents, as antifouling coatings, and as sealants, where they are moisture-crosslinkable by way of silane groups. They are also suitable as additives to cosmetic formulations, such as hairsprays or hair fixatives.

The organic silicone copolymers are preferably used for preparing release agents and abhesive coatings, i.e., coatings which repel tacky substances, such as release paper, polymeric release sheets, or release films. The abhesive coatings obtained with the organic silicone copolymers have very good release properties, which can be tailored to many different specific applications. The abhesive coatings generally adhere well to the substrate. Adhesion to the substrate to be coated can be improved further in the case of the organic silicone copolymer by incorporating further functional groups, either by means of auxiliary monomers or by means of functionality of the silicone oils of the silicone component b). Where the substrate to be coated itself bears functional groups, it is possible to incorporate in the organic silicone copolymer groups which are preferably able to react with the functional groups of the substrate, so that there is a very firm attachment of organic silicone copolymer to substrate by way of covalent bonds. Bonding can be accomplished, for example, thermally including the temperatures experienced during extrusion, or by adding catalysts. In the case of substrates to which the organic silicone copolymer does not adhere sufficiently, adhesion promoters can be used as well.

By suitable selection of the silicone component b) and its amount in the organic silicone copolymer of the invention, it is possible to obtain a wide range of desired release properties. The organic silicone copolymers are preferably applied by extrusion to substrates, or are applied during the production of the films in extrusion or coextrusion operations. The organic silicone copolymers can also be applied as solutions in organic solvent, such as toluene, petroleum spirit, methyl ethyl ketone, THF, ethyl acetate or xylene, to surfaces which are to be made repellent to tacky substances. Application may take place in any desired way which is widely known and suitable for the production of coatings from liquid substances: for example, by dipping, brushing, pouring, spraying, rolling, printing, for example by using an offset gravure coating apparatus, by blade coating or knife coating, or by means of an airbrush.

Examples of surfaces to be made repellent to tacky substances are those of paper, wood, cork, and polymer films, e.g., polyethylene films or polypropylene films, woven and nonwoven fabric of natural or synthetic fibers, ceramic articles, glass, including glass fibers, metals, polyethylene-coated paper, and boards, including those of asbestos. The abovementioned polyethylene may in each case be high-pressure, medium-pressure or low-pressure polyethylene.

In the case of paper the paper in question may be of a low-grade kind, such as absorbent papers, including kraft paper which is in the raw state, i.e., has not been pretreated with chemicals and/or natural polymeric substances, and which has a weight of from 60 to 150 $g/m^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The organic silicone copolymers are suitable, for example, for producing release, backing, and interleaving papers, including interleaving papers which are employed in the production of, for example, cast films or decorative films, or of foam materials, including those of polyurethane. The organic silicone copolymers are also suitable, for example, for producing release, backing, and interleaving cards, films, and cloths, for treating the reverse sides of self-adhesive tapes or self-adhesive sheets or the written faces of self-adhesive labels. They are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the organic silicone copolymers is the treatment of carriers for transferring pressure-sensitive adhesive films in the context of what is known as the transfer process.

The organic silicone copolymers can also be extruded in order to produce coatings or coextruded in blends with film-forming polymers in order to produce films. The application rate of the organic silicone copolymer in the coatings can be determined empirically by the skilled worker and depends largely on its composition and on the use of the coated substrate. The coatings and films offer a range of release properties appropriate for use in a variety of release applications. The coatings and films are useful in particular for producing substrates having abhesive properties, for producing preimpregnated material molds, and in the production of sheet molding compounds (SMC) and thick molding compounds (TMC), and also bulk molding compounds (BMC). The coatings and films can also be used in particular as a carrier web for the production of fiber-reinforced sheets (FRP).

The examples which follow serve to illustrate the invention in more detail without restricting it in any way whatsoever.

The following starting materials were used:

silicone b11: α-mono(3-methacryloyloxypropyl)-ω-n-butyl-polydimethylsiloxane having an average chain length of 11 and a polydispersity D of 1.4 (FM 0711 from Chisso)

silicone b21: α-mono(3-methacryloyloxypropyl)-ω-n-butyl-polydimethylsiloxane having an average chain length of 63 and a polydispersity D of 2.4 (FM 0721 from Chisso)

silicone b22: α,ω-di(3-methacryloyloxypropyl)-polydimethylsiloxane having an average chain length of 100 and a polydispersity D of 2.2 (FM 7725 from Chisso)

The weight-average molecular weight $M_w$ and the polydispersity D were determined from GPC measurements, mobile phase THF p.a., based on polystyrene standards of molecular weight 110,000, 37,000, 13,700, 4000, 1390 and 310.

EXAMPLE 1

Organic Silicone Copolymer by Solution Polymerization

A 2 l three-necked flask with stirrer, reflux condenser, metering means, thermometer, heating means (with temperature monitoring), and nitrogen port was charged with 795.2 g of methyl ethyl ketone, 3.94 g of silicone oil b11, 3.94 g of silicone oil b21, 31.56 g of methyl methacrylate and 2.89 g of t-butyl peroxypivalate (75% by weight in aliphatics; half-life $t_{1/2}$=1 h at 74° C.). This initial charge was heated to 70° C. while stirring at 200 rpm. 10 minutes after the start of the polymerization an initiator feed was added dropwise at 13.3 ml/h over 360 minutes. The initiator feed consisted of 53.25 g of methyl ethyl ketone and 11.31 g of t-butyl peroxypivalate. Simultaneously with the beginning of the initiator feed the monomer feed was run in at a rate of 83.6 ml/h over a period of 240 minutes. The monomer feed consisted of 31.56 g of silicone oil b11, 31.56 g of silicone oil b21 and 252.43 g of methyl methacrylate. 60 minutes after the end of the initiator feed the temperature was raised by 5° C. to 10° C. in order to continue polymerization to completion.

The solution obtained, containing the organic silicone copolymer, was then demonomerized by distilling off the solvent along with residual monomer and replacing the volume distilled off with fresh methyl ethyl ketone. The demonomerized solution containing the organic silicone copolymer was evaporated to dryness on a rotary evaporator and thus freed from solvent. The product comprised hard, transparent granules.

Analyses: molecular weight $M_w$ (mass average from GPC; mobile phase THF): 168,000 g/mol (based on polystyrene standards); polydispersity D: 2.3; glass transition temperature Tg (from DSC): 84° C.

EXAMPLE 2

Organic Silicone Copolymer by Solution Polymerization with Subsequent Modification by Grafting A 2 l l three-necked flask with stirrer, reflux condenser, metering means, thermometer, heating means (with temperature monitoring), and nitrogen port was charged with 798.0 g of methyl ethyl ketone, 4.03 g of silicone oil b11, 4.03 g of silicone oil b21, 32.24 g of methyl methacrylate and 983.18 mg of t-butyl peroxypivalate (75% by weight in aliphatics; half-life $t_{1/2}$=1 h at 74° C.). This initial charge was heated to 70° C. while stirring at 200 rpm. 10 minutes after the start of the polymerization an initiator feed was added dropwise at 12.0 ml/h over 360 minutes. The initiator feed consisted of 54.41 g of methyl ethyl ketone and 3.85 g of t-butyl peroxypivalate. Simultaneously with the beginning of the initiator feed the monomer feed was run in at a rate of 85.3 ml/h over a period of 240 minutes. The monomer feed consisted of 32.24 g of silicone oil b11, 32.24 g of silicone oil b21 and 257.92 g of methyl methacrylate. The batch ran for 60 minutes after the end of the initiator feed at temperature (70° C.). Then subsequent modification (by grafting reaction) of the organic silicone copolymer obtained was carried out by adding a further initiator solution to the batch. This initiator solution was added dropwise over the course of 30 minutes and consisted of 2.42 g of t-butyl peroxypivalate and 34.2 g of methyl ethyl ketone. The batch ran for 1 hour thereafter at 70° C. The solution obtained, containing the organic silicone copolymer, was subsequently demonomerized by distilling off the solvent along with residual monomer and replacing the volume distilled off with fresh methyl ethyl ketone. The demonomerized solution containing the organic silicone copolymer was evaporated to dryness on a rotary evaporator and thus freed from solvent. The product comprised hard, transparent granules.

Analyses: molecular weight $M_w$ (mass average from GPC; mobile phase THF): 321,000 g/mol (based on polystyrene standards); polydispersity D: 2.8; glass transition temperature Tg (from DSC): 86° C.

EXAMPLES 3a) AND b)

Suspension Polymerization

A 500 l stirred tank with stirrer, reflux condenser, metering means, heating means (with temperature monitoring), and nitrogen port was charged with 237.35 kg of deionized water, 771.94 g of copper acetate (1% strength aqueous solution) and 10.29 kg of polyvinylpyrrolidone (5% strength aqueous solution). The solution was stirred at 100 rpm. In the meantime a mixture of 10.29 kg of silicone oil b11, 10.29 kg of silicone oil b21 and 82.34 kg of styrene was prepared. A combination of two different initiators was added to this monomer mixture. The initiators used were 1.80 kg of t-butyl peroxyneodecanoate (95% by weight in aliphatics; half-life $t_{1/2}$=1 h at 64° C.) and 1.75 kg of t-butyl peroxypivalate (75% by weight in aliphatics; half-life $t_{1/2}$=1 h at 74° C.). The monomer mixture with the initiators was stirred for a short time at room temperature and then slowly added to the aqueous initial charge in the stirred tank. The contents of the tank were mixed by stirring at 100 rpm, as a result of which the monomers were suspended in water. The temperature was then raised to 55° C. and held for 4 hours. Thereafter the temperature was raised to 60° C. with a ramp of 0.1° C./min and held for 4 hours. This was followed by heating to 65° C. with a temperature ramp of 0.1° C./min. This temperature was held for 4 hours. Heating was then carried out to 70° C. with a temperature ramp of 0.1° C./min. This temperature was held for 4 hours. The temperature was subsequently raised to 75° C. with a ramp of 0.1° C./min and held for 4 hours. In order to complete polymerization, the temperature was raised to 80° C. and held for 2 hours. The batch was subjected to treatment with steam in order to expel volatile compounds and finally was cooled to room temperature. The beads obtained were separated from the suspending medium, i.e., from the water, by a filtration step. The product was divided into two parts: half of the beads were washed repeatedly with water and then dried (example 3a). The other half was likewise washed repeatedly with water and then washed or treated twice with isopropanol at a temperature of 50° C. for a prolonged period (approximately 4 h). Finally, washing with water was carried out again and the beads were dried (example 3b). In both cases, the beads obtained were hard and highly transparent. Analyses 3a: molecular weight $M_w$ (mass average from GPC; mobile phase THF): 280,000 g/mol (based on polystyrene standards); polydispersity D: 8.5; glass transition temperature Tg (from DSC): 78° C.

Analyses 3b: $M_w$ and D as example 3a; glass transition temperature Tg (from DSC): 79° C.

EXAMPLES 4a) AND b)

Suspension Polymerization

The procedures of examples 3a) and 3b) were followed except that the monomer mixture was a mixture of 12.87 kg of silicone oil b11, 12.87 kg of silicone oil b21 and 77.19 kg of styrene. In both cases, the beads obtained were always hard and highly transparent.

Analyses 4a: (treated only with steam and washed with water): molecular weight $M_w$ (mass average from GPC; mobile phase THF): 187 000 g/mol (based on polystyrene standards); polydispersity D: 6.9; glass transition temperature Tg (from DSC): 72° C.

Analyses 4b: (treated with steam, washed with isopropanol and water): $M_w$ and D as example 4 a; glass transition temperature Tg (from DSC): 74° C.

EXAMPLES 5a) AND b):

Suspension Polymerization

The procedures of examples 3a) and 3b) were followed, except that the monomer mixture was a mixture of 15.42 kg of silicone oil b11, 15.42 kg of silicone oil b21 and 71.95 kg of styrene. In both cases, the beads obtained were hard and highly transparent.

Analyses 5a: (treated only with steam and washed with water): molecular weight $M_w$ (mass average from GPC; mobile phase THF): 250,000 g/mol (based on polystyrene standards); polydispersity D: 5.2; glass transition temperature Tg (from DSC): 69° C.

Analyses 5b: (treated with steam, washed with isopropanol and water): all analyses as for example 5a).

EXAMPLES 6a) AND b)

Suspension Polymerization

The procedures of examples 3a) and 3b) were followed, except that the monomer mixture was a mixture of 15.42 kg of silicone oil b11, 14.91 kg of silicone oil b21, 0.51 kg of silicone b22 and 71.95 kg of styrene. In both cases, the beads obtained were hard and highly transparent.

Analyses 6a: (treated only with steam and washed with water): molecular weight $M_w$ (mass average from GPC; mobile phase THF): 420,000 g/mol (based on polystyrene standards); polydispersity D: 3.7; glass transition temperature Tg (from DSC): 72° C.

Analyses 6b: (treated with steam, washed with isopropanol and water): except for the glass transition temperature Tg=73° C., identical with the analyses of the product from example 6a.

EXAMPLES 7a) AND b)

Suspension Polymerization

The procedures of examples 3a) and 3b) were followed, except that the monomer mixture was a mixture of 10.29 kg of a silicone oil which bears a methacryloyloxymethyl group at one end and an isobutoxymethylsilyl group at the other end and additionally possesses an average chain length of 21.4 and a polydispersity D of 2.2, and 10.29 kg of silicone oil b21 and also 82.34 kg of styrene. In both cases, the beads obtained were hard and highly transparent.

Analyses 7a: (treated only with steam and washed with water): molecular weight $M_w$ (mass average from GPC; mobile phase THF): 300 000 g/mol (based on polystyrene standards); polydispersity D: 6.1; glass transition temperature Tg (from DSC): 80° C.

Analyses 7b: (treated with steam, washed with isopropanol and water): all analyses as for example 7 a).

EXAMPLE 8

Solution Polymerization

The procedure of example 2 was followed, except that the initial monomer charge consisted of a mixture of 32.24 g of methyl methacrylate, 4.03 g of silicone oil b11, 3.22 g of α-monovinyl-polydimethylsiloxane (average chain length 100 and polydispersity D=3.2) and 805.94 mg of α,ω-divinyl-polydimethylsiloxane (average chain length 100 and D=3.3). The monomer feed contained 257.92 g of methyl methacrylate, 32.24 g of silicone oil b11, 25.79 g of α-monovinyl-polydimethylsiloxane (average chain length 100 and polydispersity D=3.2) and 6.45 g of α,ω-divinyl-polydimethylsiloxane (average chain length 100 and D=3.3). The product comprised hard, transparent granules.

Analyses 8: molecular weight $M_w$ (mass average from GPC; mobile phase THF): 340,000 g/mol (based on polystyrene standards); polydispersity D: 2.5; glass transition temperature Tg (from DSC): 83° C.

COMPARATIVE EXAMPLE 9

Suspension Polymerization—Only Long-chain Silicone b2)

The procedure of example 3 was followed, except that the silicone component b) used was 20.89 kg of b22, i.e., this silicone oil exclusively (along with 82.34 kg of styrene as monomer a)). Very hard, markedly cloudy beads were obtained which were not soluble in organic solvents (beads only swelled).

Analyses 9: molecular weight $M_w$ (mass average from GPC; mobile phase THF): 620,000 g/mol (based on polystyrene standards); polydispersity D: 2.9; glass transition temperatures Tg (from DSC): −121° C.; 93° C.

COMPARATIVE EXAMPLE 10

Solution Polymerization—Only Long-chain Silicone b2)

The procedure of example 2 was followed, except that the silicone component b) used was exclusively silicone oil b21. The initial monomer charge consisted accordingly of 32.24 g of methyl methacrylate and 8.06 g of silicone oil b21, the monomer feed contained 257.92 g of methyl methacrylate and 64.48 g of silicone oil b21. The product comprised hard, somewhat cloudy granules.

Analyses: molecular weight $M_w$ (mass average from GPC; mobile phase THF): 300,000 g/mol (based on polystyrene standards); polydispersity D: 2.1; glass transition temperature Tg (from DSC): 90° C.

COMPARATIVE EXAMPLE 11

Suspension Polymerization—Only Long-chain Silicone b2)

A 2 l three-necked flask with stirrer, reflux condenser, metering means, thermometer, heating means (with temperature monitoring), and nitrogen port was charged with 1.22 kg of deionized water, 3.78 g of copper acetate (1% strength aqueous solution) and 50.35 g of polyvinylpyrrolidone (5% strength aqueous solution). The solution was stirred at 200 rpm for 10 minutes. In the meantime a mixture of 100.7 g of silicone oil b21 and 402.8 g of styrene was prepared. 25.18 g of toluene were added to this mixture. A combination of three different initiators was also added to the monomer mixture. The initiators used were 3.08 g of t-butyl peroxy-2-ethylhexanoate (98%; half-life $t_{1/2}$=1 h at 92° C.), 4.03 g of t-butyl peroxypivalate (75% in aliphatics; half-life $t_{1/2}$=1 h at 74° C.) and 5.44 g of t-butyl peroxyneodecanoate (75% in aliphatics; half-life $t_{1/2}$=1 h at 64° C.). The monomer mixture with the initiators was stirred at room temperature for 5 minutes and then slowly added to the aqueous initial charge in the three-necked flask. The contents of the flask were mixed by stirring at 200 rpm, as a result of which the monomers were suspended in water. The temperature was then raised to 55° C. over the course of 1 hour (1 h) and held for 4 hours. The temperature was raised to 70° C. over the course of 1 h and held for 4 hours. In order to complete polymerization, the temperature was raised to 80° C. over the course of 1 h and held for 4 hours. The batch was cooled to room temperature. The beads obtained were isolated by three-fold decanting and filtration with suction. The product on the suction filter was washed 5 times with deionized water. The markedly cloudy beads were dried in a drying oven at 35° C. for 24 hours.

Analyses: molecular weight $M_w$ (mass average from GPC; mobile phase THF): 240,000 g/mol (based on polystyrene standards); polydispersity D: 7.5; glass transition temperatures Tg (from DSC): −58° C. (small); 101° C.

COMPARATIVE EXAMPLE 12

Suspension Polymerization—Only Long-chain Silicone b2)

The procedure of comparative example 11 was followed, except that for the monomer mixture a mixture of 150.85 g of silicone oil b21 and 351.98 g of styrene was used. The product comprised hard, cloudy beads.

Analyses: molecular weight $M_w$ (mass average from GPC; mobile phase THF): 210,000 g/mol (based on polystyrene standards); polydispersity D: 6.8; glass transition temperatures Tg (from DSC): −47° C. (small); 98° C.

COMPARATIVE EXAMPLE 13

Suspension Polymerization—Only Short-chain Silicone b1)

The procedure of comparative example 11 was followed, except that for the monomer mixture a mixture of 100.7 g of silicone oil b11 and 402.8 g of styrene was used. The product comprised hard, highly transparent beads.

Analyses: molecular weight $M_w$ (mass average from GPC; mobile phase THF): 142,000 g/mol (based on polystyrene standards); polydispersity D: 4.5; glass transition temperature Tg (from DSC): 60° C.

Performance Testing:

1. Determination of the Release Values 1.1 Application from Solution

The organic silicone copolymers from the examples and comparative examples were dissolved in toluene or ethyl acetate with a concentration of 40% or 50% by weight. PP (polypropylene) or PET (polyethylene terephthalate) films were coated with the solution with the aid of a glass rod (coat thickness approximately 40 μm), and the abhesive properties were determined in accordance with FINAT test method No. 3 using the commercially available TESA test adhesive tapes A 7475, K 7476, and T 154. The results are collated in table 1 below. The lower the test value, the higher the release effect (and the better the release properties). For a polymer which is so adhesive that the Tesa strip can no longer be separated from the coating made with this polymer, the term "blocked" is used. In this case there are no longer any abhesive properties, and no measurement can be obtained.

1.2 Application by Means of Extrusion

The organic silicone copolymers were coextruded onto a film substrate. The release forces were determined from the organic silicone copolymer side. With respect to the TESA test adhesive tapes, the coextruded films gave values similar to those for the films coated from solution, and so only the release values for the coating with the organic silicone copolymers from solution are presented below.

2. Migration Test:

The organic silicone copolymers from the (comparative) examples were dissolved in toluene or ethyl acetate with a concentration of 40% by weight. The PP (polypropylene) or PET (polyethylene terephthalate) films were coated in each case with the solution, with the aid of a glass rod (coat thickness approximately 40 μm). Tesa-film was stuck onto the cured coating, the Tesa tape was pressed firmly with the finger, and then peeled off. The procedure was repeated twice. For assessment, the Tesa tape was adhered to itself (loop test) and pulled apart.

Assessment is made using a numerical grading system, in 6 steps:

Grade 1: no migration, Tesa adheres just as well as before (=very good result); Grade 6: very severe migration; Tesa tape no longer adheres to itself, adhesive damaged by silicone (=very poor result)

3. Bond Strength Retention or Residual Bond Strength:

In analogy to the above tests, the organic silicone copolymer was applied to film and cured. Tesa-film was stuck onto the cured coating, the Tesa tape was pressed firmly with the finger, and the Tesa-film was left on the coated film for 24 hours. Then the Tesa-film was removed and adhered to an uncoated substrate. The measurement of the force for removal was related to the force employed for an identical Tesa strip which had not been bonded to a coated film beforehand. In this test a high percentage is the best; this means that 100% is achieved when there is no reduction in bond strength and no damage to the adhesive.

4. Visual Assessment of Transparency:

1: absolutely transparent, glass-clear
2: very slight clouding
3: marked clouding
4: severe clouding, product is white, opaque 5. Rheological investigations The melt rheology was determined using the Bohlin CVO 120 HR instrument in a temperature range from 120° C. to 210° C., in exceptional cases up to 230° C. The plate/plate measuring system was chosen, with a gap distance of 200 to 1000 μm (depending on sample). With oscillating measurements at a frequency of 1 Hz the complex melt viscosity η*, the storage modulus G' and the loss modulus G" were determined. The phase angle δ is determined as tan δ=G"/G'.

The test results are collated in the table below.

Comparison of examples 3a, 4a, 5a, 6a and 7a with examples 3b, 4b, 5b, 6b and 7b shows that by means of the washing step using a solvent which is a very poor solvent or a nonsolvent for the organic silicone copolymer and which is a poor to moderate solvent for the silicone component b) it is possible to achieve a marked reduction in silicone migration.

The comparative examples 10 to 12 show that with organic silicone copolymers which contain not a mixture of the silicone components b1) and b2) but only the long-chain component b2) the values achieved in respect of migration, residual bond strength, and transparency are unsatisfactory.

Comparative example 9 shows that in the case of the organic silicone copolymers of the invention the short-chain monofunctional component is essential in order to provide a transparent and particularly extrudable material. If only a long-chain component b2) alone is used, which is difunctional, this leads to pronounced crosslinking and hence to thermoset behavior.

Comparative example 13 shows that with organic silicone copolymers which contain not a mixture of the silicone components b1) and b2) but only the short-chain component b1) alone, the compositions obtained are transparent, extrudable, and have satisfactory migration but the release properties are substantially lost.

|  | Release values in N/m | | | | | | Rheology, melt at 170° C. | | |
| --- | --- | --- | --- | --- | --- | --- | --- | --- | --- |
|  |  |  |  |  |  | Residual bond | Phase angle | Complex |  |
| Example | A7475 | K7476 | T154 | Transparency | Migration | strength in % | δ in degrees | viscosity in Pas | Extrudability |
| 1 | 29.3 | 30.7 | 3.3 | 1 | 2 | 95 | 76 | 600 | yes |
| 2 | 28.8 | 28.8 | 2.9 | 1 | 2.5 | 91 | 52 | 5000 | yes |
| 3a | 65.9 | 75.1 | 13.4 | 1 | 2 | 90 | 47 | 4000 | yes |
| 3b | 67.1 | 74.9 | 6.2 | 1 | 1 | 98 | 47 | 4200 | yes |
| 4a | 30.2 | 59.9 | 2.8 | 1 | 2 | 93 | 58 | 2000 | yes |
| 4b | 29.1 | 57.2 | 3.0 | 1 | 1 | 99 | 55 | 2300 | yes |
| 5a | 22.8 | 51.2 | 2.0 | 1 | 2.5 | 89 | 53 | 2600 | yes |
| 5b | 20.9 | 52.0 | 1.7 | 1 | 1 | 98 | 51 | 2900 | yes |
| 6a | 19.1 | 36.6 | 3.2 | 1 | 2 | 94 | 47 | 6000 | yes |
| 6b | 19.7 | 37.9 | 3.2 | 1 | 1 | 99 | 45 | 6300 | yes |
| 7a | 33.1 | 62.0 | 4.5 | 1 | 2.5 | 90 | 61 | 3500 | yes |
| 7b | 30.0 | 48.9 | 3.2 | 1 | 1 | 98 | 61 | 3600 | yes |
| 8 | 25.1 | 28.0 | 3.0 | 1 | 2 | 96 | 51 | 5500 | yes |
| C9 | not measurable | | | 2–3 | 1 | 99 | 10 | 7000 | no |
| C10 | 29.2 | 25.1 | 2.6 | 2 | 3 | 82 | 49 | 5600 | yes |
| C11 | 36.0 | 42.5 | 6.7 | 2–2.5 | 4 | 71 | 52 | 3200 | yes |
| C12 | 19.2 | 27.9 | 2.6 | 3 | 5 | 65 | 42 | 5000 | yes |
| C13 | 338.5 | blocked | 220.9 | 1 | 1.5 | 92 | 56 | 4500 | yes |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The words "a" and "an" mean one or more than one unless indicated otherwise.

What is claimed is:

1. An abhesive coated substrate comprising paper, wood, cork, polymer film, woven fabric, or non-woven fabric,
   said abhesive coating comprising an extrudable, thermoplastic organic silicone copolymer, solid at 25° C. comprising:
   a) an organic polymer component comprising from 30 to 99% by weight, based on the total weight of components a) and b), of moieties derived from one or more monomers selected from the group consisting of vinylaromatics, (meth)acrylic esters of $C_{1-15}$ alcohols, vinyl esters of branched or unbranched $C_{1-15}$ alkylcarboxylic acids, olefins, dienes, and vinyl halides, and
   b) a silicone component comprising from 1 to 70% by weight, based on the total weight of components a) and b), of moieties derived from a mixture of at least two diorganopolysiloxanes having the general formula $R^1_a R_{3-a} SiO(SiR_2O)_n SiR_{3-a}R^1_a$, in which each R is identical or different and denotes a monovalent, optionally substituted, $C_{1-18}$ alkyl or $C_{1-18}$ alkoxy radical, $R^1$ denotes a polymerizable group, a is identical or different and denotes 0 or 1, at least one a being 1, and n is an integer, where
      b1) from 5 to 65% by weight of the silicone component b) is composed of one or more diorganopolysiloxanes with $n \leq 30$ and only one terminal polymerizable group $R^1$, and
      b2) from 35 to 95% by weight of the silicone component b) is composed of one or more diorganopolysiloxanes with $n \geq 55$ and with one or two terminal polymerizable groups $R^1$, wherein said abhesive coating is a water repellant hydrophobic coating.

2. The abhesive coated substrate of claim 1, wherein alkenyl radicals having from 2 to 8 carbon atoms are present as polymerizable groups $R^1$.

3. The abhesive coated substrate of claim 1, wherein silicone component b) comprises moieties derived from at least one silicone selected from the group consisting of α,ω-divinyl-polydimethylsiloxanes, α,ω-di(3-acryloyloxypropyl)-polydimethylsiloxanes, α,ω-di(3-methacryloyloxypropyl)-polydimethylsiloxanes, α,ω-di(acryloyloxymethyl)-polydimethylsiloxanes, α-monovinyl-polydimethylsiloxanes, α-mono(3-acryloyloxypropyl)-polydimethylsiloxanes, α-mono(3-methacryloyloxypropyl)-polydimethylsiloxanes, α-mono(acryloyloxymethyl)-polydimethylsiloxanes, and α-mono(methacryloyloxymethyl)-polydimethylsiloxanes.

4. The abhesive coated substrate of claim 1, wherein said silicone component b) comprises both moieties derived from a mixture of linear mono-(meth)acryloyloxyalkyl-functional silicones with a chain length $\leq 30$ and linear mono(meth)acryloyloxyalkyl-functional silicones with a chain length $\geq 55$.

5. The abhesive coated substrate of claim 1, wherein moieties a) are derived from one or more monomers selected from the group consisting of styrene, methyl acrylate, methyl methacrylate, ethyl acrylate, ethyl methacrylate, propyl acrylate, propyl methacrylate, n-butyl acrylate; i-butyl acrylate, t-butyl acrylate, n-butyl methacrylate, i-butyl methacrylate, t-butyl methacrylate, 2-ethylhexyl acrylate, norbornyl acrylate, ethylene, and vinyl esters of $C_{1-15}$ alkylcarboxylic acids.

6. The abhesive coated substrate of claim 1 wherein said thermoplastic copolymer is a copolymer consisting essentially of moieties derived from methyl methacrylate and diorganopolysiloxanes b1) and b2).

7. The abhesive coated substrate of claim 1, wherein said abhesive coating is a melt extruded film.

8. The abhesive coated substrate of claim 1 wherein said thermoplastic copolymer is a copolymer consisting essentially of moieties derived from styrene and diorganopolysiloxanes b1) and b2).

9. The abhesive coated substrate of claim 1 wherein said substrate is paper, a polymer film, or a polyethylene coated paper.

10. An abhesive coated substrate comprising paper, wood, cork, polymer film, woven fabric, or non-woven fabric, said abhesive coating comprising an extrudable, thermoplastic organic silicone copolymer, solid at 25° C., comprising:
   a) an organic polymer component comprising from 30 to 99% by weight, based on the total weight of components a) and b), of moieties derived from one or more monomers selected from the group consisting of vinylaromatics, (meth)acrylic esters of $C_{1-15}$ alcohols, vinyl esters of branched or unbranched $C_{1-15}$ alkylcarboxylic acids, olefins, dienes, and vinyl halides, and
   b) a silicone component comprising from 1 to 70% by weight, based on the total weight of components a) and b), of moieties derived from a mixture of at least two diorganopolysiloxanes having the general formula $R^1_a R_{3-a} SiO(SiR_2O)_n SiR_{3-a} R^1_a$, in which each R is identical or different and denotes a monovalent, optionally substituted, $C_{1-18}$ alkyl or $C_{1-18}$ alkoxy radical, $R^1$ denotes a polymerizable group, a is identical or different and denotes 0 or 1, at least one a being 1, and n is an integer, where
      b1) from 5 to 65% by weight of the silicone component b) is composed of one or more diorganopolysiloxanes with $n \leq 30$ and only one terminal polymerizable group $R^1$, and
      b2) from 35 to 95% by weight of the silicone component b) is composed of one or more diorganopolysiloxanes with $n \geq 55$ and with one or two terminal polymerizable groups $R^1$,
wherein said organic polymer component comprises moieties derived from styrene, (meth)acrylic ester(s), or mixtures thereof, wherein said abhesive coating is a water repellant hydrophobic coating.

11. The abhesive coated substrate of claim 10, wherein alkenyl radicals having from 2 to 8 carbon atoms are present as polymerizable groups $R^1$.

12. The abhesive coated substrate of claim 10, wherein silicone component b) comprises moieties derived from at least one silicone selected from the group consisting of α,ω-divinyl-polydimethylsiloxanes, α,ω-di(3-acryloyloxypropyl)-polydimethylsiloxanes, α,ω-di(3-methacryloyloxypropyl)-polydimethylsiloxanes, α,ω-di(acryloyloxymethyl)-polydimethylsiloxanes, α-monovinyl-polydimethylsiloxanes, α-mono(3-acryloyloxypropyl)-polydimethylsiloxanes, α-mono(3-methacryloyloxypropyl)-polydimethylsiloxanes, α-mono(acryloyloxymethyl)-polydimethylsiloxanes, and α-mono(methacryloyloxymethyl)-polydimethylsiloxanes.

13. The abhesive coated substrate of claim 10, wherein said abhesive coating is a melt extruded film.

* * * * *